(12) United States Patent
Serikawa et al.

(10) Patent No.: US 11,581,528 B2
(45) Date of Patent: Feb. 14, 2023

(54) POSITIVE ELECTRODE FOR ALKALINE SECONDARY BATTERY AND ALKALINE SECONDARY BATTERY

(71) Applicants: TOPPAN PRINTING CO., LTD., Tokyo (JP); TOYOCHEM CO., LTD., Tokyo (JP); TOYO INK SC HOLDINGS CO., LTD., Tokyo (JP)

(72) Inventors: Masahiro Serikawa, Tokyo (JP); Tsuyoshi Kitamoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 160 days.

(21) Appl. No.: 16/483,722

(22) PCT Filed: Feb. 5, 2018

(86) PCT No.: PCT/JP2018/003807
§ 371 (c)(1),
(2) Date: Aug. 5, 2019

(87) PCT Pub. No.: WO2018/147226
PCT Pub. Date: Aug. 16, 2018

(65) Prior Publication Data
US 2020/0028157 A1    Jan. 23, 2020

(30) Foreign Application Priority Data
Feb. 8, 2017 (JP) .............................. JP2017-021380

(51) Int. Cl.
*H01M 4/24* (2006.01)
*H01M 4/62* (2006.01)
(Continued)

(52) U.S. Cl.
CPC ........... *H01M 4/242* (2013.01); *H01M 4/244* (2013.01); *H01M 4/246* (2013.01); *H01M 4/625* (2013.01);
(Continued)

(58) Field of Classification Search
CPC ...... H01M 4/244; H01M 4/242; H01M 4/246; H01M 2004/028; H01M 4/625; H01M 4/663
See application file for complete search history.

(56) References Cited

U.S. PATENT DOCUMENTS 6,828,064 B1 * 12/2004 Nardi .................... C01B 32/225
                                                       429/232
2014/0072873 A1 * 3/2014 Wang .................... H01M 4/621
                                                       429/217
(Continued)

FOREIGN PATENT DOCUMENTS

EP          0 576 943 A1    1/1994
EP          0576943 A1 *    1/1994  ............. C09D 5/448
(Continued)

OTHER PUBLICATIONS

RHOPLEX™ GL-618 NF Emulsion Polymer Safety Data Sheet, Accessed Jan. 14, 2021, https://www.dow.com/en-us/pdp.rhoplex-gl-618-nf-emulsion-polymer.153802z.html (Year: 2019).*
(Continued)

*Primary Examiner* — Cynthia H Kelly
*Assistant Examiner* — Jenna Shulman
(74) *Attorney, Agent, or Firm* — Squire Patton Boggs (US) LLP

(57) ABSTRACT

There is provided a positive electrode for an alkaline secondary battery and an alkaline secondary battery having good output properties and cycle life. To that end, a positive electrode (10) for alkaline secondary battery is obtained by
(Continued)

laminating a flexible metal substrate (11) having flexibility; a primer layer (12) having conductivity provided on one or both surfaces of the substrate (11); and a positive electrode composite material layer (13) provided on the primer layer (12) and containing a positive electrode active material, a binder resin, and a first conductive material.

12 Claims, 1 Drawing Sheet

(51) Int. Cl.
*H01M 4/66* (2006.01)
*H01M 4/02* (2006.01)

(52) U.S. Cl.
CPC ...... *H01M 4/663* (2013.01); *H01M 2004/028* (2013.01)

(56) References Cited

U.S. PATENT DOCUMENTS

| | | | | |
|---|---|---|---|---|
| 2016/0099470 | A1* | 4/2016 | Kwon | H01M 10/0525 429/217 |
| 2016/0293946 | A1 | 10/2016 | Ritter et al. | |
| 2017/0141400 | A1* | 5/2017 | Tsukamoto | C09D 133/12 |
| 2019/0284428 | A1* | 9/2019 | Carella | H01M 2/166 |

FOREIGN PATENT DOCUMENTS

| | | |
|---|---|---|
| JP | 2000-077068 A | 3/2000 |
| JP | 2010-108821 A | 5/2010 |
| JP | 2013-069671 A | 4/2013 |
| JP | 2014-035900 A | 2/2014 |
| JP | 2015-118757 A | 6/2015 |
| KR | 100646551 B1 | 11/2006 |
| WO | WO 2012/029858 A1 | 3/2012 |

OTHER PUBLICATIONS

Extended European Search Report for European Patent Application No. 18751516.8, 8 pages, Search report dated Nov. 5, 2020.
Anonymous: "Standard Test Method for Assignment of the Glass Transition Temperatures by Differential Scanning Calorimetry", E1356-08, pp. 1-4, Jan. 1, 2014.
Anonymous: "Glass Transition Temperatures", CROW's Polymer Database 2015-2020, pp. 1-6, Jan. 1, 2015.

* cited by examiner

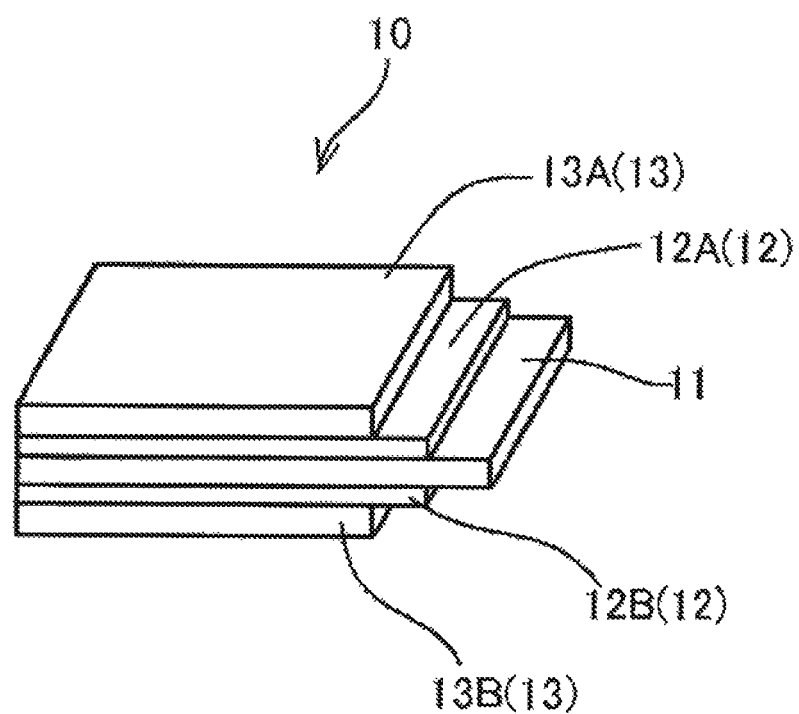

POSITIVE ELECTRODE FOR ALKALINE SECONDARY BATTERY AND ALKALINE SECONDARY BATTERY

CROSS-REFERENCE

This application is a 35 U.S.C. 371 filing of International Application No. PCT/JP2018/003807 filed on Feb. 5, 2018, which claims priority to Japanese Application No. JP 2017-021380 filed on Feb. 8, 2017, both of which are incorporated verbatim herein by reference in their entirety, including the specifications, drawings, and the claims.

TECHNICAL FIELD

The present invention relates to a positive electrode for alkaline secondary battery and an alkaline secondary battery.

BACKGROUND ART

In recent years, small portable electronic devices, such as a digital camera and a cellular phone, have been widely used. The electronic devices have been always demanded to minimize the volume and reduce the mass. Also in a battery to be mounted, the realization of a small, lightweight, and large-capacity battery has been demanded. On the other hand, also in a large secondary battery to be mounted in a bus, a track, and the like, the realization of a large secondary battery which is lightweight and has high output performance has been desired in place of a conventional lead storage battery.

In order to satisfy such a demand, the development of an alkaline secondary battery, such as a nickel hydrogen secondary battery, and a nonaqueous secondary battery, such as a lithium ion battery, has been actively performed. In order to realize the enhancement of the performance of a battery, an improvement of an electrode has been examined.

A nickel hydrogen secondary battery for use in a substation, an automobile, a train, and the like has been required to have a higher output, a higher voltage, and a higher capacity as compared with those for use in conventional dry batteries and portable devices, for example. Therefore, a large nickel hydrogen secondary battery needs to be used. When a nickel hydrogen secondary battery is mounted in a vehicle, regenerative power generated in braking is stored in the mounted nickel hydrogen secondary battery, so that the mounted nickel hydrogen secondary battery is usable as the power source of the vehicle. Therefore, the operation energy efficiency of the vehicle can be increased. Herein, when the regenerative power is charged into the nickel hydrogen secondary battery, the regenerative power needs to be rapidly charged with a large current. On the other hand, when the vehicle is driven using the nickel hydrogen secondary battery, the regenerative power needs to be rapidly discharged with a large current.

In general, in a positive electrode for an alkaline secondary battery including a nickel hydrogen battery, porous substrates, such as foamed nickel, are used as a collector (for example, refer to Patent Documents 1 and 2). The porous substrate is filled with nickel hydroxide powder, the surface of which is covered with cobalt hydroxide, cobalt oxyhydroxide, or the like or nickel hydroxide powder to which a cobalt compound, such as cobalt hydroxide or cobalt oxide, is added. The cobalt hydroxide, cobalt oxide, and the like are changed to cobalt oxyhydroxide in charging to exhibit high electrical conductivity to form a fine conductive network between nickel hydroxide particles.

CITATION LIST

Patent Literatures

PTL 1: JP 2000-77068 A
PTL 2: JP 2010-108821 A

SUMMARY OF INVENTION

Technical Problem

However, there have been circumstances that the foamed nickel is expensive, difficult to achieve a reduction in film thickness, and limited in an improvement of an output. Hence, a positive electrode for an alkaline secondary battery of an aspect in which a foil-like substrate is coated with an active material has been examined. However, the positive electrode of such an aspect is inferior to an electrode impregnated with the foamed nickel in current collection or adhesion of the interface of the substrate and has had room for improvement of output properties and cycle life.

The present invention has been made in view of the above-described circumstances. It is an object of the present invention to provide a positive electrode for alkaline secondary battery and an alkaline secondary battery having good output properties and cycle life.

Solution to Problem

A positive electrode for alkaline secondary battery of one aspect of the present invention for solving the above-described problems is obtained by laminating a metal substrate having flexibility,
a primer layer having conductivity provided on one or both surfaces of the substrate, and
a positive electrode composite material layer provided on the primer layer and containing a positive electrode active material, a binder resin, and a first conductive material.

An alkaline secondary battery of one aspect of the present invention for solving the above-described problems has a positive electrode obtained by laminating a metal substrate having flexibility, a primer layer having conductivity provided on one or both surfaces of the substrate, and a positive electrode composite material layer provided on the primer layer and containing a positive electrode active material, a binder resin, and a first conductive material,
a negative electrode, and
a separator.

Advantageous Effects of Invention

One aspect of the present invention can provide a positive electrode for alkaline secondary battery and an alkaline secondary battery having good output properties and cycle life.

BRIEF DESCRIPTION OF DRAWINGS

FIG. 1 is a perspective view illustrating the configuration of one embodiment of a positive electrode for alkaline secondary battery.

DESCRIPTION OF EMBODIMENTS

Hereinafter, one embodiment of the present invention will now be described with reference to the drawings.

The following detailed description describes specific details so as to provide perfect understanding about the embodiment of the present invention. However, it is clear that one or more embodiments can be carried out without such specific details. Moreover, in order to make the drawing simple, well-known structures and devices are illustrated in a rough sketch.

(Positive Electrode for Alkaline Secondary Battery)

As illustrated in FIG. 1, a positive electrode 10 for alkaline secondary battery of this embodiment has a substrate 11, primer layers 12A and 12B formed on both surfaces thereof, and positive electrode composite material layers 13A and 13B laminated on the primer layers 12A and 12B, respectively. Herein, the primer layer 12 may be provided on one or both surfaces of the substrate 11. As the configuration of the positive electrode 10 for alkaline secondary battery, an aspect may be acceptable in which the primer layer 12 and the positive electrode composite material layer 13 are laminated in this order on one surface of the substrate 11. More specifically, the positive electrode 10 for alkaline secondary battery is obtained by laminating at least the substrate 11, the primer layer 12 provided on one or both surfaces of the substrate 11, and the positive electrode composite material layer 13 in this order. The primer layer 12 is formed by applying a primer composition to one or both surfaces of the substrate 11. The positive electrode composite material layer 13 is formed by applying a composite material ink containing the first conductive material onto the primer layer 12.

<Substrate>

The substrate 11 is a metal plate-like member having flexibility. The substrate 11 contains a foil-like collector obtained by thinly beating metal, for example. A substrate having smooth front and end surfaces is mentioned. Therefore, the substrate 11 does not include foamed nickel or one having irregularities due to a porous structure disadvantageous for the formation of a primer layer and include one subjected to hole machining with a two-dimensional structure (for example, punching plate).

[Material of Substrate]

A material of the substrate 11 is preferably nickel from the viewpoint of alkaline electrolyte resistance. Moreover, materials are preferable which are obtained by plating the front surface of an iron material with nickel in order to prevent the corrosion due to an electrolyte from the viewpoint of cost.

For the substrate 11, a plate-like foil having a smooth front surface is used in order to apply a primer composition.

[Thickness of Substrate]

The thickness of the substrate 11 is preferably 6 μm or more and 30 μm or less, for example. When the thickness of the substrate 11 is 6 μm or more, the strength of the substrate 11 itself is further improved, so that breakage of an electrode is hard to occur in coating or press working. When the thickness of the substrate 11 is 30 μm or less, the strength of the substrate 11 itself is easily set appropriately, so that winding up of the substrate 11 in coating is further facilitated. Specifically, by setting the thickness of the substrate 11 to 6 μm or more and 30 μm or less, for example, such durability that wrinkles or peeling cannot be visually observed as the surface state in pressing a positive electrode (for example, Roll gap of 0, Pressing pressure of 5 t) can be imparted. When a material subjected to hole machining with a two-dimensional structure is adopted as the substrate 11, for example, the upper limit of the range mentioned above is sometimes exceeded insofar as the material has such durability that the material is not broken in production and wrinkles or peeling cannot be visually observed as the surface state according to the opening density.

[Thickness of Nickel Plating]

As described above, when a nickel plated material is used as the substrate 11, the thickness of the nickel plating is preferably 0.1 μm or more and 5 μm or less and more preferably 0.2 μm or more and 3 μm or less. When the thickness of the nickel plating is 0.1 μm or more, the corrosion due to an electrolyte is hard to occur. When the thickness of the nickel plating is 5 μm or less, it is advantageous in cost.

<Primer Layer>

The primer layer 12 is a layer having conductivity provided on one or both surfaces of the substrate 11. The primer layer 12 is preferably formed by producing a primer composition containing lamellar graphite particles (A), carbon black (B), and an aqueous resin (C), and then applying the primer composition to the substrate 11 and drying the same. The thickness of the primer layer 12 is preferably 1 μm or more and 20 μm or less.

<Primer Composition>

The primer composition contains a second conductive material having an average particle diameter of 1 μm or more and 50 μm or less and an aspect ratio of 10 or more and 100 or less. Specifically, it is preferable to contain a second conductive material having an average particle diameter of 1 μm or more and 50 μm or less and an aspect ratio of 10 or more and 100 or less, for example, and further contain an aqueous resin. The primer composition preferably contains "other conductive materials" as necessary. The "other conductive materials" are selected as appropriate according to the object insofar as the advantageous effects are not impaired and, for example, particulate graphite and carbon black having an aspect ratio of less than 10 are mentioned.

[Second Conductive Material]

The second conductive material is particles having conductivity with an average particle diameter of 1 μm or more and 50 μm or less. The average particle diameter in this embodiment means a particle diameter (D50) when the volume proportion of particles are added up from particles having a fine particle diameter, so that the volume proportion of the particles reaches 50% in a volume particle size distribution of a mixture obtained by mixing the particles, water, and a dispersion obtained using a particle size distribution meter of a dynamic light scattering system ("Microtrac MT3100II" manufactured by MictotracBEL Corp.).

As the shape of the second conductive material, the aspect ratio is 10 or more and 100 or less. Examples of such a shape include a lamellar (scale-like) or fibrous shape having a smooth particle surface. The aspect ratio in this embodiment is a value calculated by performing measurement in the thickness direction of arbitrary 10 to 50 particles using a measurement average value between two points from an image of the second conductive material enlarged as appropriate by 10,000 to 100,000 times using scanning electron microscope observation (SEM), and then dividing the average particle diameter by the thickness.

Furthermore, a material of the second conductive material may be an organic (carbon-based) conductive material or an inorganic (metal-based) conductive material. Examples of the organic material include graphite (graphite), graphene, carbon nanotube, and the like. The lamellar graphite is described below. Examples of the fibrous second conductive material include carbon fiber and the like. Examples of the inorganic material include alkali resistant metal powder, metal piece, and fibrous metal.

[Lamellar Graphite]

The lamellar graphite can be obtained by pulverizing massive natural graphite or performing interlayer peeling along the cleavage surface of an intercalation compound of natural graphite, for example. In the case of using the pulverization, lamellar graphite can be obtained by a dry type pulverization method using a ball mill or the like, for example.

The lamellar graphite can also be obtained by the method utilizing the cleavage surface of an intercalation compound described above. Specifically, the lamellar graphite is obtained by, for example, a method for peeling the cleavage surface of a crystal structure of expanded graphite obtained by heating and expanding an intercalation compound of graphite and sulfuric acid obtained by treating natural graphite with a mixed acid of sulfuric acid and nitric acid, an intercalation compound of graphite and sulfuric acid obtained by electrically oxidizing natural graphite in sulfuric acid, or the like, for example. In the expanded graphite, the gap between layers of the cleavage surface is wide. Therefore, interlayer peeling is easily performed along the cleavage surface, so that a smooth particle surface, i.e., lamellar graphite particle, is obtained.

Examples of the lamellar graphite particles include UF-2, CBF-1, CBF-3, CPF-3, 96L, COP, FAC-1, FAC-2, FGB, CSP-2, and CF-2 manufactured by Fuji Kokuen K. K., CSSP, CSPE, CSP, CP, CB-150, CB-100, ACP, ACB-150, SP-10, SP-20, JSP, SP-270, HOP, CMX, UP-5, UP-10, and UP-20 manufactured by Nippon Graphite, CX-3000, FBF, BF, CBR, SSC-3000, SSC-600, SSC-3, SSC, CX-600, CPF-8, CPF-3, CPB-6S, CPB-3, 96E, 96L, 96L-3, 90L-3, CPC, S-87, K-3, CF-80, CF-48, CF-32, CP-150, CP-100, CP, HF-80, HF-48, HF-32, SC-120, SC-80, SC-60, and SC-32 manufactured by Chuetsu Graphite Works Co., Ltd., SNO-20, SNO-10, SNO-5, SNE-20, SNE-10, and SNE-5 manufactured by SEC CARBON, LIMITED., and Z-5F, CNP-7, CNP-15, CNP-35, Z-100, Z+80, Z-25, Z-50, X-10, and X-20 manufactured by Ito Graphite Co., Ltd.

[Other Conductive Materials]

The other conductive materials (for example, carbon black) enter a gap formed by particle groups of lamellar graphite particles to thereby serve to improve the conductivity of the primer layer 12. With respect to the contribution of the other conductive materials to the improvement of conductivity, it is assumed that the conductivity is improved when not all the other conductive materials enter the gap but some of the other conductive materials enter the gap. The blending ratio when the lamellar graphite particles and the other conductive materials are used is determined as appropriate according to the object. The other conductive materials may be added insofar as the advantageous effects of the present invention are not impaired. Due to the fact that the other conductive materials are appropriately present in the primer layer 12, the adhesion between the substrate 11 and the positive electrode composite material layer 13 is further improved and the conductivity is also further improved. Hereinafter, carbon black is described as an example of the "other conductive materials".

The carbon black is preferably furnace black produced by continuously thermally decomposing a gas or liquid raw material in a reactor, Ketchen black containing particularly ethylene heavy oil as a raw material, channel black obtained by burning a raw material gas, applying the flame to the bottom surface of a channel steel, and then rapidly cooling the same for deposition, thermal black containing gas as a raw material and obtained by periodically repeating combustion and thermal decomposition, acetylene black containing particularly acetylene gas as a raw material, or the like. Moreover, carbon black subjected to commonly performed oxidation treatment, hollow carbon, and the like are usable. The carbon black can be used alone or in combination of two or more kinds.

The average primary particle size of the carbon black is preferably 0.01 μm or more and 0.3 μm or less. Herein, the average primary particle size is obtained by averaging the numerical values of 10 to 50 particles from an image expanded as appropriate by 10,000 times to 100,000 times using a transmission electron microscope (TEM). Furthermore, when the value of the specific surface area of the carbon black is larger, the contact point of carbon black particles increases, and therefore the carbon black is advantageous for lowering the internal resistance of an electrode.

Specifically, the specific surface area (BET) determined from the nitrogen adsorption amount is preferably 20 $m^2/g$ or more and 1500 $m^2/g$ or less, more preferably 50 $m^2/g$ or more and 1500 $m^2/g$ or less, and still more preferably 100 $m^2/g$ or more and 1500 $m^2/g$ or less. When carbon black having a specific surface area of less than 20 $m^2/g$ is used, sufficient conductivity is difficult to obtain in some cases. Carbon black having a specific surface area of more than 1500 $m^2/g$ is difficult to acquire in a market.

Examples of commercially-available carbon black include TOKABLACK #4300, #4400, #4500, and #5500, and the like (manufactured by Tokai Carbon Co., Ltd., Furnace black), Printex L and the like (manufactured by Degussa, Furnace black), Raven7000, 5750, 5250, 5000ULTRAIII, 5000ULTRA, and the like, Conductex SC ULTRA, Conductex 975 ULTRA, and the like, PUER BLACK100, 115, and 205, and the like (manufactured by Columbian, Furnace black), #2350, #2400B, #2600B, #3050B, #3030B, #3230B, #3350B, #3400B, #5400B, and the like (manufactured by Mitsubishi Chemical Corporation, Furnace black), MONARCH1400, 1300, and 900, VulcanXC-72R, BlackPearls2000, and the like (manufactured by Cabot Corporation, Furnace black), Ensaco250G, Ensaco260G, Ensaco350G, and SuperP-Li (manufactured by TIMCAL), Ketchen black EC-300J and EC-600JD (manufactured by Akzo), DENKA BLACK, DENKA BLACK HS-100, and FX-35 (manufactured by DENKI KAGAKU KOGYO K.K., Acetylene black), and the like. However, the commercially-available carbon black is not limited thereto and two or more kinds thereof may be combined.

[Aqueous Resin]

The aqueous resin is used in order to bind lamellar graphite particles or the carbon black described above and, when the primer layer 12 is formed, bring the primer layer 12 and the substrate 11 into close contact with each other and bring the positive electrode composite material layer 13 and the primer layer 12 into close contact with each other.

Examples of the aqueous resin include, for example, an acrylic resin, a polyurethane resin, a polyester resin, a phenol resin, an epoxy resin, a phenoxy resin, a urea resin, a melamine resin, an alkyd resin, a formaldehyde resin, a silicon resin, a fluororesin, a cellulosic resin, such as carboxymethylcellulose, a synthetic rubber, such as styrene-butadiene rubber or, fluororubber, a conductive resin, such as polyaniline or polyacetylene, and the like, and high molecular weight compounds containing fluorine atoms, such as polyvinylidene fluoride, polyvinyl fluoride, and tetrafluoroethylene. Moreover, denatured substances, mixtures, or copolymers of the resins may be acceptable. The aqueous resins can also be used alone or in combination of two or more kinds thereof.

As the form of the aqueous resin, a water soluble type, an emulsion type, a hydrosol type, and the like are mentioned and can be selected as appropriate. When the aqueous resin contained in the primer composition is a water-soluble type resin, the aqueous resin contained in the positive electrode composite material layer (positive electrode composite material ink) described later is preferably the emulsion type resin.

<Radical Scavenger>

Herein, a radical scavenger may be contained in the primer layer 12.

The radical scavenger contained in the primer layer 12 is preferably contained in a proportion of 0.01% by mass or more and 5% by mass or less in a primer composition configuring the primer layer 12. As the content of the radical scavenger, the radical scavenger is more preferably contained in a proportion of 0.1% by mass or more and 0.5% by mass or less.

The radical scavenger may be present not only in the primer layer 12 but in the positive electrode composite material layer 13 as a result of being contained in the primer layer 12 in the production of a positive electrode. More specifically, the radical scavenger may be contained at least in the primer layer 12.

The content of the radical scavenger is preferably 0.01% by mass or more and 20.0% by mass or less based on 100 parts by mass of the binder resin.

When a conductive assistant is contained in the positive electrode for alkaline secondary battery of this embodiment, the content of the radical scavenger to the conductive assistant is preferably 0.01% by mass or more and 20.0% by mass or less.

Examples of the radical scavenger include a hindered amine-based light stabilizer (HALS), for example. Examples of the hindered amine-based light stabilizer include, for example, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).bis(tridecyl)-1,2,3,4-butanetetracarboxylate, bis(1,2,2,6,6-pentamethyl-4-piperidyl).bis(tridecyl)-1,2,3,4-butanetetracarboxylate, bis (1,2,2,6,6-pentamethyl-4-piperidyl)-2-butyl-2-(3,5-ditertiary butyl-4-hydroxy benzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-trioctylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino-s-triazine-6-ylamino]undecane, 1,6,11-tris[2,4-bis(N-butyl-N-(1,2,2,6,6-pentamethyl-4-piperidyl)amino-s-triazine-6-ylamino]undecane, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5]undecane, and the like.

[Method for Producing Primer Composition]

Next, a method for producing a primer composition is described. First, lamellar graphite particles are preferably used after being produced as a dispersion by blending a solvent and a dispersant to perform dispersion beforehand. Also when carbon black is used, the carbon black is preferably used after being produced as a dispersion as with the lamellar graphite particles. Then, the lamellar graphite particle dispersion, the carbon black dispersion, and an aqueous resin are mixed, whereby the primer composition can be obtained. As the dispersant, a cellulose-based resin, an acrylic resin, a styrene/acrylic resin, a polyester resin, a urethane resin, a surfactant, and the like are preferable.

For the dispersion and the mixing, dispersers and mixers commonly used for pigment dispersion and the like are usable. For example, mixers, such as a disper, a homomixer, or a planetary mixer; homogenizers, such as "Clearmix" manufactured by M Technique Co., Ltd., or "FILMIX" of PRIMIX; media dispersers, such as a paint conditioner (manufactured by Red Devil), a ball mill, a sand mill ("DYNOMILL" manufactured by Shinmaru Enterprises Corporation., and the like), an Attritor, a pearl mill ("DCP MILL" manufactured by Nippon Eirich Co., Ltd.), or CoBall Mill; medialess dispersers, such as wet jet mill ("Genus PY" manufactured by Genus, Inc., "Star Burst" manufactured by Sugino Machine Limited, and "Nanomizer" manufactured by NANOMIZER Inc.), "CLEAR SS-5" manufactured by M Technique Co., Ltd., or "MICROS" manufactured by Nara Machinery Co., Ltd.; or, in addition thereto, roll mills are mentioned. However, the dispersers and the mixers are not limited thereto. Moreover, a disperser subjected to treatment for preventing metal mixing from the disperser is preferably used as the disperser.

For example, in the case of using the media dispersers, it is preferable to use a method using a disperser having an agitator and a vessel formed of ceramic or resin or to use a disperser in which the surface of an agitator and a vessel formed of metal is subjected to treatment, such as tungsten carbide spraying or resin coating. As the media, glass beads, zirconia beads, or ceramic beads, such as alumina beads, are preferably used. In the case of using the roll mill, a ceramic roll is preferably used. Dispersing devices may be used alone or may be used in combination of two or more kinds thereof.

[Others]

In the primer composition, a film forming assistant, an antifoaming agent, a leveling agent, a dispersant, an antiseptic agent, a pH adjuster, a viscosity modifier, and the like can be further blended as necessary.

[Viscosity]

The viscosity of the primer composition may be adjusted as appropriate by a coating method thereof and is preferably set to 10 mPa·s or more and 30,000 mPa·s or less.

[Method for Applying Primer Composition]

Examples of a method for applying the primer composition to the substrate 11 include, for example, a die coating method, a roll coating method, a doctor coating method, a knife coating method, a spray coating method, a gravure coating method, a screen coating method, or an electrostatic coating method. For drying, devices, such as an air blowing drier, a warm air drier, an infrared heater, and a far-infrared heater, are usable and the devices are not particularly limited thereto. For example, standing drying may also be acceptable.

<Positive Electrode Composite Material Layer>

The positive electrode composite material layer 13 is a layer provided on the primer layer 12 and containing a positive electrode active material, a first conductive material, and a binder resin. The positive electrode composite material layer 13 is formed by applying a composite material ink onto the primer layer 12. More specifically, the composite material ink contains the positive electrode active material, the first conductive material, and the binder resin. The thickness of the positive electrode composite material layer 13 is 20 µm or more and 120 µm or less, for example.

[Positive Electrode Active Material]

As the positive electrode active material, those known as a positive electrode active material for alkaline secondary battery are usable. For example, nickel compounds, such as nickel hydroxide and nickel oxyhydroxide, manganese dioxide, and silver oxide are mentioned. As the type of the nickel hydroxide, cobalt coated nickel hydroxide obtained by coating the surface of nickel hydroxide with at least one of cobalt hydroxide and cobalt oxyhydroxide is more preferable. Moreover, those obtained by adding and mixing cobalt hydroxide, cobalt oxide, and the like to/with nickel hydroxide, are also usable.

In this embodiment, desired conductivity is acquired without the cobalt coat, and therefore cost down can be achieved. However, it is not hindered to use the cobalt coated nickel hydroxide for further improving conductivity by the use thereof.

[Particle Diameter of Positive Electrode Active Material]

The particle diameter of the positive electrode active material is preferably 0.5 µm or more and 100 µm or less, more preferably 1 µm or more and 50 µm or less, and still more preferably 3 µm or more and 40 µm or less.

[Blending Ratio of Positive Electrode Active Material]

The ratio of the active material to the total nonvolatile content of the composite material ink is preferably 80% by mass or more and 98% by mass or less and more preferably 85% by mass or more and 95% by mass or less.

[Binder Resin]

The binder resin is used as a resin for binding the positive electrode active materials and the positive electrode active material and the primer layer 12 in forming the positive electrode composite material layer 13. The binder resin is preferably an aqueous resin and a polymer emulsion is mentioned as such a resin, for example.

[Polymer Emulsion]

The binder resin is preferably a polymer emulsion having a glass transition temperature of −20° C. or more and 20° C. or less, for example. Such a polymer emulsion is preferably an acrylic emulsion which contains 1% by mass or more and 5% by mass or less of a first monomer containing a hydration functional group, 20% by mass or more and 60% by mass or less of a second monomer containing an aromatic ring, and 35% by mass or more and 79% by mass or less of a third monomer not containing a hydration functional group and an aromatic ring and in which the monomer mixture is synthesized by emulsion polymerization. Due to the fact that the positive electrode composite material layer 13 contains the emulsion, the conductivity of the positive electrode is further improved and the charge/discharge cycle properties (cycle life) are also further improved.

[Monomer Having Hydration Functional Group]

The monomer containing the hydration functional group is a monomer containing a hydrophilic functional group. For example, hydroxy group containing monomers, such as hydroxyethyl acrylate (Glass transition temperature Tg of homopolymer=15° C., The same applies hereinafter.), hydroxypropyl acrylate (Tg=−7° C.), hydroxybutyl acrylate (Tg=−80° C.), hydroxyethyl methacrylate (Tg=55° C.), hydroxypropyl methacrylate (Tg=26° C.), and hydroxybutyl methacrylate (Tg=−40° C.), amide group containing monomers, such as acrylamide (Tg=153° C.), methacrylamide (Tg=77° C.), diacetoneacrylamide (Tg=77° C.), N-isopropylacrylamide (Tg=134° C.), N-methylacrylamide (Tg=130° C.), N-methylmethacrylamide (Tg=65° C.), N,N-dimethylacrylamide (Tg=119° C.), N-eghylacrylamide (Tg=100° C.), N,N-diethylacrylamide (Tg=81° C.), N-butylacrylamide (Tg=46° C.), hydroxyethylacrylamide (Tg=98° C.), and acryloyl morpholine (Tg=145° C.), glycidyl group containing monomers, such as glycidyl methacrylate (Tg=41° C.) and glycidyl acrylate (Tg=10° C.), and the like are mentioned.

The use amount of the monomer containing the hydration functional group is preferably 1% by mass or more and 5% by mass or less and more preferably 2% by mass or more and 4% by mass or less. When the use amount is 1% by mass or more, the chemical stability is further improved due to the hydration effect with a water molecule. When the use amount is 5% by mass or less, the stability in the emulsion polymerization is further improved. More specifically, there is a tendency that the flowability of an emulsion increases, so that an emulsion is hard to coagulate.

[Aromatic Ring Containing Monomers]

The aromatic ring containing monomers is described. By the use of the aromatic ring containing monomers, the use amount of acrylic acid alkylester, for example, which is likely to be hydrolyzed in an alkaline solution can be reduced, and therefore the alkali resistance can be further improved. Furthermore, the adhesiveness to a substrate can be further improved by controlling the glass transition point of an emulsion in a suitable range.

The use amount of the aromatic ring containing monomers is preferably 20% by mass or more and 60% by mass or less and more preferably 25% by mass or more and 55% by mass or less in the total monomers. When the use amount is 20% by mass or more, the alkali resistance of a polymer is further improved. When the use amount is 60% by mass, the adhesiveness to a substrate further is improved.

Examples of the aromatic ring containing monomers include styrene (Glass transition temperature Tg of homopolymer=100° C., The same applies hereinafter.), α-methylstyrene (Tg=168° C.), benzyl methacrylate (Tg=54° C.), and the like.

[Other Monomers]

Other monomers are described.

Other monomers in this embodiment are radical polymerizable monomers other than the monomers containing the hydration functional group monomers and the aromatic ring containing monomers.

As the other monomers, methacrylic acid esters, such as methyl methacrylate (Tg=100° C.), ethyl methacrylate (Tg=65° C.), butyl methacrylate (Tg=20° C.), isobutyl methacrylate (Tg=67° C.), tertiary butyl methacrylate (Tg=107° C.), 2-ethylhexyl methacrylate (Tg=−10° C.), and cyclohexyl methacrylate (Tg=66° C.); acrylic acid esters, such as methyl acrylate (Glass transition temperature Tg of homopolymer=−8° C., The same applies hereinafter.), ethyl acrylate (Tg=−20° C.), butyl acrylate (Tg=−45° C.), and acrylic acid-2-ethyl hexyl (Tg=−55° C.), and the like can be mentioned, for example.

The other monomers are preferably selected as appropriate so that the theoretical glass transition temperature Tg of a polymer is −20° C. or more and 20° C. or less. The range of the theoretical glass transition temperature Tg of a polymer is more preferably −15° C. or more and 15° C. or less.

The theoretical glass transition temperature Tg of a polymer of an emulsion in this embodiment is drawn by the following expression [I].

$$1/Tg=[(W1/Tg1)+(W2/Tg2)+ \ldots +(Wn/Tgn)]/100 \quad [I]$$

in which
W1: % by mass of monomer 1
Tg1: Glass transition temperature (K) of a homopolymer which may be formed from only the monomer 1,
W2: % by mass of monomer 2
Tg2: Glass transition temperature (K) of a homopolymer which may be formed only from the monomer 2,
Wn: % by mass of monomer n
Tgn: Glass transition temperature (K) of a homopolymer which may be formed from the monomer n,
(herein W1+W2+ . . . +Wn=100).

When one having a radical polymerizable unsaturated group is used as an emulsifier in polymerizing radical polymerizable unsaturated monomers in an aqueous medium, the emulsifier having a radical polymerizable unsaturated group is not included in the monomers in the specification of the configuration of the radical polymerizable unsaturated monomer and the calculation of the Tg of a copolymer.

[Emulsifier]

It is important for the binder resin in this embodiment to be copolymerized in emulsion polymerization. In the copolymerization, an emulsifier is preferably used from the viewpoint of polymerization stability.

The emulsifier amount is preferably 0.1 part by mass or more and 5 parts by mass or less and more preferably 1 part by mass or more and 3 parts by mass or less based on 100 parts by mass in total of monomers to be used. When the emulsifier amount is 0.1 part by mass or more, the polymerization stability is further improved. When the emulsifier amount is 5 parts by mass or less, the alkali resistance of a secondary battery electrode is further improved.

In this embodiment, anionic emulsifiers or nonionic emulsifiers can be used alone or in combination as the emulsifier. The emulsifier may be a reactive emulsifier having a radical polymerizable functional group or may be a nonreactive emulsifier not having a radical polymerizable functional group. Alternatively, both of them can also be used in combination.

Among the emulsifiers to be used in this embodiment, the reactive emulsifier is an anionic or nonionic emulsifier having one or more radical polymerizable unsaturated double bonds in the molecule. For example, a sulfosuccinic acid ester type (as commercially-available items, LATEMUL S-120P and S-180A manufactured by Kao Corporation, ELEMINOL JS-2 manufactured by Sanyo Chemical Industries, Ltd., and the like, for example) and an alkyl ether phenol type (as commercially-available items, AQUALON KH-10 and RN-20 manufactured by Daiichi Kogyo Seiyaku Co., Ltd., and the like) are mentioned.

Among the emulsifiers to be used in this embodiment, examples of the nonreactive emulsifier include an anionic nonreactive emulsifier and a nonionic nonreactive emulsifier.

—Anionic Nonreactive Emulsifier—

Examples of the anionic nonreactive emulsifier include, for example, polyoxyethylene alkyl phenyl ether sulfate, polyoxyethylene polycyclic phenyl ether sulfate, polyoxyethylene alkyl ether sulfate, and the like.

Specific examples of the anionic nonreactive emulsifier include HITENOL NF-08 [Number of repetitions of ethylene oxide units (hereinafter referred to as "EO unit number"): 8] and NF-17 (Number of EO units: 17) [manufactured by Daiichi Kogyo Seiyaku Co., Ltd.], ELEMINOL CLS-20 (Number of EO units: 10), ELEMINOL ES-12 (Number of EO units: 6), ES-30 (Number of EO units: 15), and ES-70 (Number of EO units: 35) [manufactured by Sanyo Chemical Industries, Ltd.], and the like.

—Nonionic Nonreactive Emulsifier—

Examples of the nonionic nonreactive emulsifier include, for example, polyoxyethylene alkyl phenyl ethers, such as polyoxyethylene nonylphenyl ether and polyoxyethylene octyl phenyl ether; polyoxyethylene alkyl ethers, such polyoxyethylene lauryl ether and polyoxyethylene stearyl ether, and polyoxyethylene oleyl ether; polyoxy polycyclic phenyl ethers, such as polyoxyethylene distyrenated phenyl ether; polyoxyethylene sorbitan fatty acid ester, and the like.

Specific examples of the nonionic nonreactive emulsifier include EMULGEN 1108 (Number of EO units: 8), 1118S-70 (Number of EO units: 18), 1135S-70 (Number of EO units: 35), and 1150S-70 (Number of EO units: 50) [all manufactured by Kao Corporation], and the like.

The nonreactive emulsifiers may be used alone or can also be used in combination of two or more kinds thereof.

Among emulsifiers, known substances are usable as the reactive emulsifier.

Examples of the radical polymerization initiator usable in this embodiment include persulfates, such as potassium persulfate, ammonium persulfate, and sodium persulfate, for example.

The use amount of the polymerization initiator is preferably 0.1 part by mass or more and 1 part by mass or less and more preferably 0.2 part by mass or more and 0.8 part by mass or less based on 100 parts by mass in total of the monomers to be used for emulsion polymerization. When the use amount is 0.1 part by mass or more, the polymerization stability is further improved. When the use amount is 1 part by mass or less, the water resistance is further improved.

Moreover, the use of a redox initiator in which a peroxide-based initiator and a reducing agent are combined is also preferable. As the redox initiator, a combination of a peroxide-based initiator and a reducing agent is preferable. Examples of the peroxide-based initiator include Perbutyl H (tertiary butyl hydroperoxide), Perbutyl O (tertiary butyl peroxy-2-ethyl hexanoate), cumene hydroperoxide, and p-menthane hydroperoxide. Examples of the reducing agent include Erbit N (sodium isoascorbate), L-ascorbic acid (vitamin C), sodium sulfite, sodium hydrogen sulfite, sodium pyrosulfite (SMBS), and sodium hyposulfite (hydrosulfite).

[First Conductive Material]

In the composite material ink, a first conductive material is further contained. As the first conductive material, nickel powder, copper powder, cobalt oxide, cobalt hydroxide, carbon, and the like can be mentioned, for example. Two or more of the substances can be used in combination. As the carbon, acetylene black, Ketchen black, furnace black, carbon fiber, and fullerenes can be mentioned. Among the above, acetylene black and furnace black are preferable. Since the particle diameter of the first conductive material is large, the first conductive material is preferably used by being dispersed to 0.1 μm or more and 50 μm or less using water and a dispersion resin beforehand. The dispersion resin is preferably an acrylic water soluble resin, a styrene/acrylic water soluble resin, a water-soluble polyester resin, an aqueous urethane resin, or the like.

In the composite material ink, the binder resin is preferably blended in a proportion of preferably 0.05 part by mass or more and 20 parts by mass or less and more preferably 0.1 part by mass or more and 10 parts by mass or less based on 100 part by mass of the active material. In the case of less than 0.05 part by mass, the binding capacity of the active material and the primer layer 12 decreases, and, as a result, the contact between the active material and the substrate 11 is not held, so that there is a possibility that the utilization factor of the positive electrode decreases. When 20 parts by mass are exceeded, the proportion of the active material in the composite material ink decreases and the energy density of an electrode is likely to decrease. Furthermore, there is also a risk that, due to an increase in the proportion of a polymer which hardly conducts electricity, the electric resistance of an electrode increases.

In the composite material ink, a film forming assistant, an antifoaming agent, a leveling agent, a dispersant, an antiseptic, a pH adjuster, a viscosity modifier, and the like can be further blended as necessary.

The viscosity of the composite material ink can be selected as appropriate according to a coating method and is preferably set to 100 mPa·s or more and 30,000 mPa·s or less.

(Method for Producing Positive Electrode for Alkaline Secondary Battery)

A method for producing a positive electrode for alkaline secondary battery includes a process of forming the primer layer 12 on the substrate 11 and a process of forming the positive electrode composite material layer 13 on the primer layer 12.

Herein, the process of forming the primer layer 12 is performed by applying a primer composition onto a metal substrate and drying the same.

The process of forming the positive electrode composite material layer 13 is performed by applying a composite material ink containing a polymer emulsion obtained by performing emulsion polymerization as a binder resin, an active material, and a first conductive material onto the primer layer 12 and drying the same.

The primer composition preferably contains a second conductive material having an average particle diameter of 1 μm or more and 50 μm or less and an aspect ratio of 10 or more and 100 or less.

In the positive electrode 10 for alkaline secondary battery, an electrode may be subjected to pressing treatment by lithographic press, calender roll, and the like after the formation of the positive electrode composite material layer 13 on the primer layer 12. Thus, the adhesiveness between the primer layer 12 and the positive electrode composite material layer 13 is further improved.

[Disperser and Mixer]

For the mixing of the active material and the binder resin when producing the composite material ink, the same dispersers and mixers as those in the production of the primer composition are usable.

(Alkaline Secondary Battery)

The alkaline secondary battery of this embodiment is provided with the positive electrode for alkaline secondary battery of this embodiment, a negative electrode, an electrolyte, and a separator.

The negative electrode is produced by applying a negative electrode composite material ink containing a negative electrode active material onto a substrate and drying the same. Examples of the negative electrode active material include a hydrogen absorbing alloy, cadmium (including an alloy), zinc (including an alloy), compounds thereof, and the like.

The shape of the alkaline secondary battery of this embodiment can be formed into various shapes, such as a paper type, a cylindrical type, a coin type, a button type, and a lamination shape, according to the intended use.

Examples of the electrolyte include a potassium hydroxide aqueous solution and those obtained by adding sodium hydroxide or lithium hydroxide to a potassium hydroxide aqueous solution.

Examples of the separator include, for example, polyethylene nonwoven fabric, polypropylene nonwoven fabric, polyamide nonwoven fabric, and those obtained by performing hydrophilic treatment thereto but the separator is not particularly limited thereto.

An alkaline secondary battery provided with the positive electrode for alkaline secondary battery of this embodiment can be preferably used for applications, such as a substation, a bus, a track, and a train.

EXAMPLES

The present invention is more specifically described with reference to Examples but the following Examples do not limit the scope of the present invention at all. In Examples and Comparative Examples, "part(s)" represent "part(s) by mass".

Example 1

<Production of Positive Electrode Ink>

To 100 parts by mass of nickel hydroxide, 10 parts by mass of carbon (first electric conductive material, manufactured by Tokai Carbon Co., Ltd., TOKABLACK #4300) and 10 parts by mass of a binder resin of an aqueous resin (manufactured by TOYOCHEM CO., LTD., TOCRYL S-171, Theoretical Glass transition temperature Tg of polymer=−2° C.) were added, and then pure water was added so that the residual solid content after drying was 60% and stirred for 15 minutes by a disper to produce a positive electrode ink.

<Production of Primer Composition>

To 100 parts by mass of lamellar graphite (manufactured by Nippon Graphite, UP-20) having an average particle diameter of 25 μm and an aspect ratio of 68 as a second electric conductive material, 5 parts of a dispersant (manufactured by BASF A.G., Joncryl 70J) was added, and then pure water was added so that the residual solid content after drying was 30% to prepare a primer composition. Thereafter, the primer composition was subjected to 20 pass dispersion treatment by a bead mill.

<Formation of Primer Layer>

The primer composition was applied to both surfaces of a substrate containing a 15 μm thick Ni-plated steel plate by an applicator, and then dried to form a primer layer. The primer layer was formed with a thickness per surface of 1 μm.

<Formation of Positive Electrode Composite Material Layer>

To each primer layer, the positive electrode ink was applied by an applicator so that the coating amount was 150 g/m² to form a positive electrode composite material layer so that the thickness after drying was 100 μm to produce a positive electrode of Example 1. More specifically, in the positive electrode of Example 1, the positive electrode composite material layer was formed so that the total thickness of the positive electrode composite material layer was 200 μm and the coating amount of the positive electrode active material in the positive electrode composite material layer was 300 g/m². Therefore, the total thickness of the positive electrode of Example 1 is 217 µm.

<Production of Negative Electrode Ink>

To 100 parts by mass of a hydrogen absorbing alloy, 10 parts by mass of carbon (manufactured by Tokai Carbon Co., Ltd., TOKABLACK #4300) and 10 parts by mass of a binder resin (manufactured by TOYOCHEM CO., LTD., TOCRYL S-171, Theoretical Glass transition temperature Tg of polymer=−2° C.) were added, and then pure water was added so that the residual solid content after drying was 60% and stirred for 15 minutes by a disper to produce a negative electrode ink.

<Formation of Negative Electrode>

Thereafter, to each of both surfaces of a substrate containing a 15 µm thick Ni-plated steel plate, the negative electrode ink was applied by an applicator so that the coating amount was 250 g/m² to form a negative electrode composite material layer so that the thickness after drying was 100 µm to produce a negative electrode. More specifically, in the production the negative electrode, the negative electrode composite material layer was formed so that the total thickness of the negative electrode composite material layer was 200 µm and the coating amount of the negative electrode active material in the negative electrode composite material layer was 500 g/m². Therefore, the negative electrode thickness of each of Examples 1 to 11 and Comparative Example 1 is 215 µm.

<Production of Alkaline Secondary Battery>

On a coin cell, a negative electrode, a 200 µm thick sulfonated PP nonwoven fabric separator, and a positive electrode were laminated in this order, an alkaline electrolyte was injected, and then curing was performed for one day to permeate the electrolyte to produce an alkaline secondary battery of Example 1.

Example 2

A positive electrode and an alkaline secondary battery of Example 2 were produced in the same manner as in Example 1, except changing the thickness of the primer layer in Example 1 to 10 µm and changing the thickness of the substrate to 6 µm.

Example 3

A positive electrode and an alkaline secondary battery of Example 3 were produced in the same manner as in Example 1, except changing the thickness of the primer layer in Example 1 to 10 µm.

Example 4

A positive electrode and an alkaline secondary battery of Example 4 were produced in the same manner as in Example 3, except changing the thickness of the substrate in Example 3 to 30 µm.

Example 5

A positive electrode and an alkaline secondary battery of Example 5 were produced in the same manner as in Example 1, except changing the thickness of the primer layer in Example 1 to 20 µm.

Example 6

A positive electrode and an alkaline secondary battery of Example 6 were produced in the same manner as in Example 1, except changing the thickness of the primer layer in Example 1 to 26 µm.

Example 7

A positive electrode and an alkaline secondary battery of Example 7 were produced in the same manner as in Example 4, except changing the lamellar graphite having an average particle diameter of 20 µm to particulate graphite (manufactured by Nippon Graphite, UP-5) having an average particle diameter of 6 µm and an aspect ratio of 22 as the second electric conductive material in Example 4.

Example 8

A positive electrode and an alkaline secondary battery of Example 8 were produced in the same manner as in Example 4, except containing a radical scavenger (Tinuvin DW-123 (manufactured by BASF A.G.)), the content in the primer composition of which was set to 0.1% by mass, as the primer layer in Example 4.

Example 9

A positive electrode and an alkaline secondary battery of Example 9 were produced in the same manner as in Example 4, except containing a radical scavenger (Tinuvin DW-123 (manufactured by BASF A.G.)), the content to the binder resin of which was set to 0.1% by mass, as the primer layer in Example 4.

Example 10

A positive electrode and an alkaline secondary battery of Example 10 were produced in the same manner as in Example 4, except containing a radical scavenger (Tinuvin DW-123 (manufactured by BASF A.G.)), the content to the first conductive material of which was set to 0.1% by mass, as the primer layer in Example 4.

Example 11

A positive electrode and an alkaline secondary battery of Example 11 were produced in the same manner as in Example 8, except containing a radical scavenger (Tinuvin DW-123 (manufactured by BASF A.G.)), the content in the primer composition of which was set to 5% by mass, as the primer layer in Example 8.

Comparative Example 1

An alkaline secondary battery of Comparative Example 1 was produced in the same manner as in Example 1, except not forming the primer layer in Example 1.

TABLE 1

| | Ex. 1 | Ex. 2 | Ex. 3 | Ex. 4 | Ex. 5 | Ex. 6 | Ex. 7 |
|---|---|---|---|---|---|---|---|
| Positive electrode total thickness (μm) | 217 | 226 | 235 | 250 | 255 | 265 | 250 |
| Positive electrode composite material layer thickness (one surface, μm) | 100 | 100 | 100 | 100 | 100 | 100 | 100 |
| Primer layer thickness (one surface, μm) | 1 | 10 | 10 | 10 | 20 | 26 | 10 |
| Shape of second conductive material | Lamellar | Lamellar | Lamellar | Lamellar | Lamellar | Lamellar | Particulate |
| Radical scavenger (% by mass) | — | — | — | — | — | — | — |
| Substrate thickness (μm) | 15 | 6 | 15 | 30 | 15 | 15 | 30 |
| Theoretical capacitance | ◉ | ◉ | ◉ | ○ | ○ | ○ | ○ |
| Cycle life | ○ | ◉ | ◉ | ◉ | ○ | ○ | ○ |
| Output properties | ○ | ○ | ○ | ○ | ○ | ○ | ○ |

| | Ex. 8 | Ex. 9 | Ex. 10 | Ex. 11 | Comp. Ex. 1 |
|---|---|---|---|---|---|
| Positive electrode total thickness (μm) | 250 | 250 | 250 | 250 | 215 |
| Positive electrode composite material layer thickness (one surface, μm) | 100 | 100 | 100 | 100 | 100 |
| Primer layer thickness (one surface, μm) | 10 | 10 | 10 | 10 | — |
| Shape of second conductive material | Particulate | Particulate | Particulate | Particulate | Lamellar |
| Radical scavenger (% by mass) | 0.1 to primer composition | 0.1 to binder resin | 0.1 to first conductive material | 5 to primer composition | — |
| Substrate thickness (μm) | 30 | 30 | 30 | 30 | 15 |
| Theoretical capacitance | ○ | ○ | ○ | ○ | ◉ |
| Cycle life | ◉ | ◉ | ◉ | ◉ | × |
| Output properties | ○ | ○ | ○ | ○ | × |

(Evaluation)

The alkaline secondary batteries of Examples 1 to 11 and Comparative Example 1 produced as described above were evaluated for "capacitance", "cycle life", and "output properties" as follows.

<Capacitance>

The number of positive electrodes per cm in thickness when the total thickness of the positive electrode composite material layer except the substrate was set to 200 μm, the thickness of the negative electrode was set to 215 μm, and the thickness of the separator was set to 200 μm and the positive electrode and the negative electrode are alternately laminated so that one separator is certainly present between the positive electrode and the negative electrode was defined as 100% theoretical capacitance. In this Example, it is sometimes simply referred to as "capacitance".

Next, when a value obtained by adding the thickness of the substrate and the thickness of the primer layer to the thickness of the positive electrode in the produced alkaline secondary batteries of Examples 1 to 11 and Comparative Example 1 was defined as the thickness of the positive electrode in Examples 1 to 11 and Comparative Example 1, a case where the number of the positive electrodes per cm in thickness was 95% or more of the 100% theoretical capacitance described above was evaluated as "◉", a case where the number of the positive electrodes per cm in thickness was 90% or more of the 100% theoretical capacitance was evaluated as "○", and the number of the positive electrodes per cm in thickness was less than 90% of the 100% theoretical capacitance was defined as ×. More specifically, the evaluation was performed supposing that the theoretical capacitance per volume when the substrate and the primer layer are not provided is set to 100% and a reduction in theoretical capacitance when the thickness corresponding to the substrate and the primer layer increases is allowed up to 10%. The evaluation results are given in Table 1.

<Cycle Life>

With respect to the produced alkaline secondary batteries of Examples 1 to 11 and Comparative Example 1, a program of performing activation treatment including 10 cycles of 0.2 c, 120% charge—0.2 c, 1.0 V cut discharge, performing charge at 1 c for 60 minutes, giving a suspension for 10 minutes, performing discharge up to 1.0 V at 1 c, and then giving a suspension for 10 minutes was specified as one cycle, and the cycle was repeatedly performed without resting. Thereafter, when the discharge utilization factor was less than 60%, the test was ended. Then, the number of the cycles was defined as the cycle life. The results are evaluated according to the following evaluation criteria evaluate and given in Table 1.

[Evaluation Criteria]

◉: Cycle life is 3000 times or more.
○: Cycle life is 2000 times to 3000 times.
×: Cycle life is less than 2000 times.

<Output Properties>

With respect to the produced alkaline secondary batteries of Examples 1 to 11 and Comparative Example 1, the discharge utilization factor when charge at 1 c for 60 minutes was performed, a suspension for 10 minutes was given, and then discharge up to 1.0 V at 10 c was performed was defined as the output property. Then, the evaluation was performed according to the following evaluation criteria. The evaluation results are given in Table 1.

[Evaluation Criteria]

○: Discharge utilization factor is 80% or more.

x: Discharge utilization factor is less than 80%.

As given in Table 1, Examples 1 to 11 in which the thickness of the primer layer was 1 μm or more and 20 μm or less had good capacitance, cycle life, and output properties and showed a result that the cycle life and the output properties were higher than those of Comparative Example 1. Particularly Examples 2 to 4 show excellent results about the cycle life. More specifically, Examples 1 to 11 contribute to providing an alkaline secondary battery capable of performing rapid charge/discharge by sharply lowering the electric resistance of the interface between the substrate and the active material.

Thus, from the results given in Table 1, a positive electrode for alkaline secondary battery and an alkaline secondary battery with good durability, output properties, and cycle life can be provided.

REFERENCE SIGNS LIST 10 positive electrode for alkaline secondary battery
11 base material
12 (12A, 12B) primer layer
13 (13A, 13B) positive electrode composite material layer

The invention claimed is:

1. A positive electrode for alkaline secondary battery having a lamination comprising:
   a metal substrate having flexibility;
   a primer layer having conductivity provided on one or both surfaces of the substrate; and
   a positive electrode composite material layer provided on the primer layer and containing a positive electrode active material, a binder resin, and a first conductive material,
   wherein the primer layer contains a second conductive material having an average particle diameter of 1 μm or more and 50 μm or less and an aspect ratio of 68 or more and 100 or less,
   wherein the second conductive material is a lamellar graphite, and
   wherein the binder resin is an emulsion polymerized resin.

2. The positive electrode for alkaline secondary battery according to claim 1, wherein an aqueous resin is contained in the primer layer and the positive electrode composite material layer.

3. The positive electrode for alkaline secondary battery according to claim 2, wherein the aqueous resin contained in the primer layer contains a water soluble resin and the aqueous resin contained in the positive electrode composite material layer contains an emulsion type resin.

4. The positive electrode for alkaline secondary battery according to claim 3, wherein a glass transition temperature of the emulsion type resin is −20° C. or more and 20° C. or less.

5. The positive electrode for alkaline secondary battery according to claim 1, wherein 0.01% by mass or more and 5% by mass or less of a radical scavenger is contained in a primer composition of the primer layer.

6. The positive electrode for alkaline secondary battery according to claim 5, wherein a content of the radical scavenger is 0.01% by mass or more and 20.0% by mass or less based on 100 parts by mass of the binder resin.

7. The positive electrode for alkaline secondary battery according to claim 5, wherein the radical scavenger is hindered amine.

8. The positive electrode for alkaline secondary battery according to claim 5, wherein the first conductive material is contained in the positive electrode composite material layer and a content of the radical scavenger to the first conductive material is 0.01% by mass or more and 20.0% by mass or less.

9. The positive electrode for alkaline secondary battery according to claim 1, wherein a thickness of the substrate is 6 μm or more and 30 μm or less.

10. The positive electrode for alkaline secondary battery according to claim 1, wherein the substrate is a nickel-plated steel sheet.

11. An alkaline secondary battery comprising:
    the positive electrode for alkaline secondary battery according to claim 1;
    a negative electrode; and
    a separator.

12. The alkaline secondary battery according to claim 11, wherein the negative electrode contains a hydrogen absorbing alloy, cadmium, or zinc.

* * * * *